Patented Sept. 27, 1932

1,880,169

UNITED STATES PATENT OFFICE

NICHOLAS BENNETT, OF APPLETON, WIDNES; HERBERT DODD, OF GLAZEBROOK, NEAR MANCHESTER, AND WILLIAM COLIN SPRENT, OF CRESSINGTON, LIVERPOOL, ENGLAND, ASSIGNORS TO IMPERIAL CHEMICAL INDUSTRIES LIMITED, OF NOBEL HOUSE, BUCKINGHAM GATE, LONDON, ENGLAND

MANUFACTURE AND PRODUCTION OF AROMATIC ACID CHLORIDES

No Drawing. Application filed November 21, 1928, Serial No. 321,030, and in Great Britain February 2, 1928.

This invention relates to an improved method of preparing aromatic acid chlorides and in particular benzoyl chloride. It is already known that benzoyl chloride can be prepared by the action of one molecule of water on one molecule of benzotrichloride as shown in the following formula:—

1. $C_6H_5C.Cl_3 + H_2O = C_6H_5COCl + 2HCl$

This reaction includes the following intermediate step which can be used independently if desired.

2. $C_6H_5COOH + C_6H_5C.Cl_3 =$
$$2C_6H_5COCl + HCl$$

According to the present invention a different method has been adopted by employing benzal chloride instead of benzotrichloride. This new method has the advantage that the product obtained has a lower percentage of chlorine combined with a nuclear carbon atom which is high when the fully chlorinated body namely benzotrichloride is used.

Consequently the method according to the present invention is the inter-reaction of benzal chloride and benzoic acid with the formation of a mixture of benzaldehyde and benzoyl chloride. This latter mixture is then chlorinated when all the benzaldehyde is converted to benzoyl chloride and the final product of the combined reaction is benzoyl chloride as shown by the following formulæ:—

3. $C_6H_5CH.Cl_2 + C_6H_5COOH =$
$$C_6H_5C.HO + C_6H_5COCl + HCl$$

4. $C_6H_5CHO + C_6H_5COCl + Cl_2 =$
$$2C_6H_5COCl + HCl$$

The process according to this invention may be modified in the following manner. Instead of starting with benzal chloride and benzoic acid, ½ molecule of water and one molecule of benzal chloride may be the initial materials. On allowing these to react an equi-molecular mixture of benzaldehyde and benzal chloride results. By chlorination this mixture is converted to an equi-molecular mixture of benzal chloride and benzoyl chloride. If sufficient water is now added to hydrolyse the benzoyl chloride to benzoic acid an equi-molecular mixture of benzoic acid and benzal chloride is obtained which will react to form benzoyl chloride, as in the first Example. The whole of the water may be added at the start if desired and the result will be the same.

The reactions involved may be set out as follows:—

5. $2C_6H_5CHCl_2 + H_2O =$
$$C_6H_5CHO + 2HCl + C_6H_5CHCl_2$$

6. $C_6H_5CHO + C_6H_5CHCl_2 + Cl_2 =$
$$C_6H_5COCl + C_6H_5CHCl_2 + HCl$$

7. $C_6H_5COCl + H_2O + C_6H_5CHCl_2 =$
$$C_6H_5COOH + C_6H_5CHCl_2 + HCl$$

8. $C_6H_5COOH + C_6H_5CH.Cl_2 =$
$$C_6H_5CO.Cl + C_6H_5CHO + HCl$$
(See equation 3)

9. $Cl_2 + C_6H_5CO.Cl + C_6H_5CHO =$
$$2C_6H_5CO.Cl + HCl$$
(See equation 4)

If desired benzoyl chloride may be made directly by the action of benzal chloride on benzoic anhydride and subsequent chlorination as follows:—

10. $(C_6H_5CO)_2O + C_6H_5CHCl_2 =$
$$C_6H_5CHO + 2C_6H_5COCl$$

11. $C_6H_5CHO + 2C_6H_5COCl + Cl_2 =$
$$3C_6H_5COCl + HCl$$

Other aromatic acid chlorides, for example chlor benzoyl chloride may be prepared in an analogous way by the action of $Cl_2$ and water on chlor benzal chlorides.

The following examples will further illustrate how the said invention can be carried out in practice but the invention is not restricted to these examples. The parts are by weight.

Example 1

244 parts of dry sublimed benzoic acid are added to 322 parts of pure dry distilled benzal chloride (53° Tw.) The mixture is heated to 100° centigrade when all the benzoic acid is in solution. The mixture is then further heated on an oil bath with a reflux condenser fitted to the flask containing the mixture. The reaction commences at about 120° centigrade and hydrochloric acid is evolved. The temperature is kept at from 125° to 130° centigrade for the first hour, and is then raised to from 140° to 145° centigrade for another three hours. The temperature is then allowed to rise to 175° centigrade during another period of 2 hours. The mixture is then allowed to cool down to from 160° to 165° centigrade and chlorine is introduced at a moderate speed for about two and a half hours. When all the benzaldehyde is chlorinated hydrochloric acid ceases to be evolved, and free chlorine appears in the exit. The mixture at this stage is 43° Tw. at 16° centigrade. It is now fractionated and the fraction boiling at from 194° to 198° centigrade is isolated. About 473 parts of benzoyl chloride is obtained amounting to a yield of about 84 per cent.

*Example 2*

570 parts of pure distilled benzal chloride (1.265 sp. gr.) contained in a lead apparatus are heated to 140° centigrade by means of an oil bath.

When temperature is constant 60 parts of water are caused to drop slowly into the heated benzal chloride, when hydrochloric acid is steadily evolved. When the water has entered, chlorine gas is slowly passed through the mixture. When hydrochloric acid has ceased to evolve and no more water vapour can be seen in the condenser, approximately in 12 hours, the temperature is raised to from 190° to 200° centigrade for a further 10 to 12 hours for the purpose of condensation. The completion of the reaction will be noted by the absence of hydrochloric acid. The crude product is distilled. 460 parts of benzoyl chloride is obtained from the above example amounting to a 93 per cent yield of excellent quality.

In this example after all the water is used up the reaction takes the same course as in Example 1, namely:—

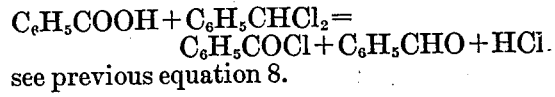

$C_6H_5COOH + C_6H_5CHCl_2 = C_6H_5COCl + C_6H_5CHO + HCl$ see previous equation 8.

*Example 3*

570 parts of crude benzal chloride (1.250 sp. gr.) are treated under the same conditions as in the above Example 2. A yield of benzoyl chloride is obtained of about 93 per cent of excellent quality.

What we claim is:—

1. The manufacture and production of aromatic monocarboxylic acid chlorides of the benzene series by the reaction of aromatic chlorides of the benzene series with one of the group consisting of aromatic monocarboxylic acids and aromatic monocarboxylic acid anhydrides of the benzene series and the subsequent chlorination of the mixture formed.

2. The manufacture and production of aromatic monocarboxylic acid chlorides of the benzene series by the interaction of aromatic chlorides of the benzene series and aromatic monocarboxylic acids of the benzene series and subsequent chlorination of the mixture formed.

3. The manufacture and production of benzoyl chloride by the inter-reaction of benzal chloride and benzoic acid, and the subsequent chlorination of the mixture of benzaldehyde and benzoyl chloride thus obtained.

4. The manufacture and production of aromatic mono-carboxylic acid chlorides of the benzine series by the interaction of aromatic chlorides of the benzene series and aromatic mono-carboxylic acid anhydrides of the benzene series, and the subsequent chlorination of the mixture formed.

5. The manufacture and production of benzoyl chloride by the action of benzal chloride on benzoic anhydride and subsequent chlorination of the mixture obtained.

6. The manufacture and production of aromatic mono-carboxylic acid chlorides of the benzene series by the action of water and chlorine on substitution products of aromatic chlorides of the benzene series, substantially as hereinbefore described.

7. The process for the manufacture and production of aromatic mono-carboxylic acid chlorides of the benzene series comprising mixing water with aromatic chlorides of the benzene series and treating the resulting product with chlorine.

8. The process for the manufacture and production of benzoyl chloride comprising mixing water with benzal chloride and treating the resulting product with chlorine.

In testimony whereof we have signed our names to this specification.

NICHOLAS BENNETT.
HERBERT DODD.
WILLIAM COLIN SPRENT.